(12) United States Patent
Edwards et al.

(10) Patent No.: US 12,045,459 B2
(45) Date of Patent: Jul. 23, 2024

(54) USING A VIRTUAL KEYBOARD TO ENTER PARTICULAR INPUT

(71) Applicant: Capital One Services, LLC, McLean, VA (US)

(72) Inventors: Joshua Edwards, Philadelphia, PA (US); Lauren Fox, Herndon, VA (US); Michael Mossoba, Great Falls, VA (US)

(73) Assignee: Capital One Services, LLC, McLean, VA (US)

( * ) Notice: Subject to any disclaimer, the term of this patent is extended or adjusted under 35 U.S.C. 154(b) by 1 day.

(21) Appl. No.: 17/662,186

(22) Filed: May 5, 2022

(65) Prior Publication Data
US 2023/0359350 A1     Nov. 9, 2023

(51) Int. Cl.
*G06F 3/04886*     (2022.01)
(52) U.S. Cl.
CPC .................. *G06F 3/04886* (2013.01)
(58) Field of Classification Search
None
See application file for complete search history.

(56) References Cited

U.S. PATENT DOCUMENTS

| | | | |
|---|---|---|---|
| 10,440,007 B1* | 10/2019 | Ramalingam | G06F 3/0484 |
| 2010/0291895 A1* | 11/2010 | Drzyzga | G06Q 20/322 |
| | | | 455/410 |
| 2011/0112920 A1* | 5/2011 | Mestre | G06Q 20/40 |
| | | | 705/17 |
| 2014/0053098 A1* | 2/2014 | Leyon | G06F 21/31 |
| | | | 715/780 |
| 2016/0027015 A1* | 1/2016 | Redpath | G06Q 20/202 |
| | | | 705/72 |
| 2018/0248698 A1* | 8/2018 | Kominar | G06F 21/45 |
| 2019/0289016 A1* | 9/2019 | Malan | H04L 63/107 |
| 2020/0104474 A1* | 4/2020 | Duane | H04W 12/77 |
| 2020/0279265 A1 | 9/2020 | Seal | |

* cited by examiner

*Primary Examiner* — Rinna Yi
(74) *Attorney, Agent, or Firm* — Harrity & Harrity, LLP

(57) ABSTRACT

In some implementations, a user device may receive, from a first other device, a first message, wherein the first message includes information indicating an event associated with an account of a user of the user device. The user device may provide, based on receiving the first message, a virtual keyboard for display on a display screen of the user device. The user device may obtain, based on providing the virtual keyboard, particular input. The user device may send to a second other device, and based on the particular input, a second message, wherein sending the second message is to cause the second other device to perform one or more actions associated with the event that is associated with the account of the user.

19 Claims, 7 Drawing Sheets

USING A VIRTUAL KEYBOARD TO ENTER PARTICULAR INPUT

BACKGROUND

A user device can provide a virtual keyboard that allows for a user to enter information into the user device without a physical input device. A typical virtual keyboard is displayed on a display screen of the user device. The user interacts (e.g., via a touchscreen interface of the display screen) with keys of the virtual keyboard to enter particular characters into an input field of the virtual keyboard.

SUMMARY

Some implementations described herein relate to a user device. The user device may include one or more memories and one or more processors communicatively coupled to the one or more memories. The user device may be configured to receive a first message that is associated with an electronic messaging account of a user of the user device. The user device may be configured to provide, based on receiving the first message, a virtual keyboard for display on a display screen of the user device. The user device may be configured to obtain, based on providing the virtual keyboard, particular input. The user device may be configured to send, to another device and based on the particular input, a second message that is not associated with the electronic messaging account.

Some implementations described herein relate to a non-transitory computer-readable medium that stores a set of instructions for a user device. The set of instructions, when executed by one or more processors of the user device, may cause the user device to receive a first message that is associated with an electronic messaging account of a user of the user device. The set of instructions, when executed by one or more processors of the user device, may cause the user device to provide, based on receiving the first message, a virtual keyboard for display on a display screen of the user device. The set of instructions, when executed by one or more processors of the user device, may cause the user device to obtain, based on providing the virtual keyboard, particular input. The set of instructions, when executed by one or more processors of the user device, may cause the user device to process the particular input to make an authentication determination. The set of instructions, when executed by one or more processors of the user device, may cause the user device to send, to another device and based on the authentication determination, a second message that is not associated with the electronic messaging account.

Some implementations described herein relate to a method. The method may include receiving, by a user device and from a first other device, a first message, where the first message includes information indicating an event associated with an account of a user of the user device. The method may include providing, by the user device and based on receiving the first message, a virtual keyboard for display on a display screen of the user device. The method may include obtaining, by the user device and based on providing the virtual keyboard, particular input. The method may include sending, by the user device, to a second other device, and based on the particular input, a second message, where sending the second message is to cause the second other device to perform one or more actions associated with the event that is associated with the account of the user.

DETAILED DESCRIPTION

Figure 1A:
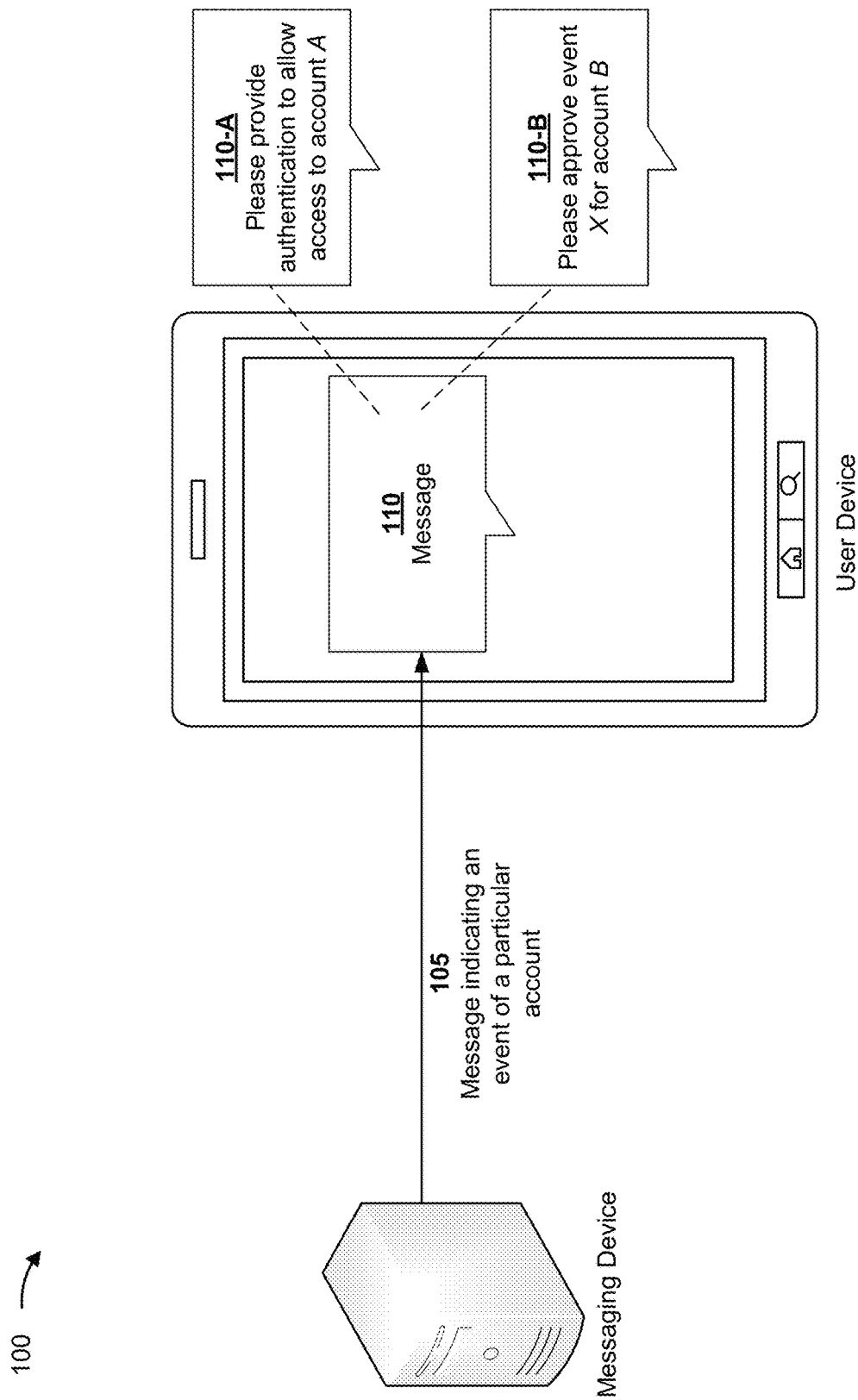
FIGS. 1A-1D are diagrams of an example implementation relating to using a virtual keyboard to enter particular input.

The following detailed description of example implementations refers to the accompanying drawings. The same reference numbers in different drawings may identify the same or similar elements.

Two-factor authentication can provide an extra layer of security for accessing an account and/or approving an event (e.g., an automated task, such as turning on or off lights, execution of a financial transaction, or another event) that is associated with the account. However, in many cases, one of the steps in a two-factor authentication process may include sending a text message (e.g., a short message system (SMS) message, a rich communication services (RCS) message, or another text message) to a user device of a user of the account. If the user device is compromised (e.g., a bad actor, such as another person other than the user of the account, is able to access and utilize the user device), the bad actor can review the text message and interact with the user device to provide a response that enables access to the account and/or approval of the event. For example, the bad actor can respond "Yes" to a text message asking if the user of the account approves access to the account and/or the event. This allows the bad actor unauthorized access to the account and thereby enables the bad actor to execute one or more fraudulent acts. Consequently, computing resources (e.g., processing resources, memory resources, communication resources, and/or power resources, among other examples), such as of devices associated with maintaining the account, may be used to identify, address, and/or resolve issues associated with the one or more fraudulent acts.

Some implementations described herein provide a user device, which provides a virtual keyboard (e.g., that can be installed as a default virtual keyboard of the user device). The user device receives, from a messaging device (e.g., a messaging server), a message (e.g., a text message or an email message) associated with an event of an account (e.g., a social media account, a financial account, or another account). For example, the message may be a request message to allow access to the account or may be a purchase verification message. The user device provides the virtual keyboard (e.g., for display on a display screen of the user device) when the message is displayed on the user device (e.g., in a messaging application). The user may interact with the virtual keyboard to provide an indication that the user wants to enter particular input (e.g., authentication credentials associated with the account) into the virtual keyboard (e.g., to approve or disapprove the event). The user device thereby causes the virtual keyboard to present an additional input field in which the user enters the particular input. The user device obtains the particular input from the additional input field and processes the particular input (e.g., to verify the authentication credentials). The user device then sends, to an account device associated with the account (e.g., an account server), a message indicating whether the legitimate authentication credentials were entered. Based on the message, the account device approves or disapproves the event associated with the account. For example, the account device may grant or deny access to the account or may grant or deny a purchase associated with the account.

In this way, the user device reduces a likelihood that a bad actor (e.g., who has possession of, or has access to, the user device) is able to interact with the user device to provide a response that enables access to an account and/or approval of an event associated with the account. For example, the bad actor would not, without having access to additional information, be able to enter particular input that includes authentication credentials of the user associated with the account. This reduces a likelihood that the bad actor gains unauthorized access to the account and thereby reduces a likelihood that the bad actor is able to execute one or more fraudulent acts. Accordingly, an amount of computing resources (e.g., processing resources, memory resources, communication resources, and/or power resources, among other examples), such as of devices associated with maintaining the account, needed to identify, address, and/or resolve issues associated with fraud is reduced.

FIGS. 1A-1D are diagrams of an example 100 associated with using a virtual keyboard to enter particular input. As shown in FIGS. 1A-1D, example 100 includes a user device, a messaging device, and an account device. These devices are described in more detail in connection with FIGS. 2 and 3.

The messaging device may be associated with an electronic communication account (e.g., of a user of the user device), such as a text messaging account, an email account, an instant messaging account, a voicemail account, an audio messaging account, or another electronic messaging account. The messaging device may be configured to communicate messages that conform to a message type associated with the electronic communication account. For example, the messaging device may be configured to communicate text messages (e.g., short message system (SMS) messages and/or rich communication services (RCS) messages), emails, instant messages, voicemail messages, and/ or audio messages. The account device may be associated with a particular account (e.g., another account of the user of the user device) that is different than the electronic communication account, such as a social media account, a financial account, another electronic communication account (e.g., another text messaging account, another email account, and/or another instant messaging account), or a different account (e.g., that is not the electronic communication account associated with the messaging device). The account device may be configured to communicate messages that conform to a different message type than that communicated by the message device. For example, the account device may be configured to communicate other types of messages that are different than text messages, emails, instant messages, voicemail message, and/or audio messages. The account device may be, for example, an authentication device for authenticating users of the particular account.

As shown in FIG. 1A, and by reference number 105, the messaging device may send a message 110, such as a message that is associated with the electronic account, to the user device (e.g., for the user device to display the message on a display of the user device). For example, the messaging device may send a text message, an email message, an instant message, a voicemail message, an audio message, or another type of electronic message, to the user device.

The message 110 may include information indicating an event that is associated with the particular account (e.g., that is associated with the account device). In some implementations, the event may be associated with access to the particular account. For example, as further shown in FIG. 1A, the messaging device may send a message 110-A that includes a request to provide authentication to allow access to the particular account (e.g., by the user device or another device). In some implementations, as further shown in FIG. 1A, the messaging device may send a message 110-B that includes a request for approval of an event that is associated with the particular account. The event may be, for example, access to the particular account or performance of a transaction associated with the other account (e.g., publication of a social media posting associated with a social media account, or execution of a financial transaction, such as a credit card purchase or a bank account transfer, of a financial account, among other examples). The messaging device may send the message 110 (e.g., message 110-A or message 110-B) based on receiving, from another device (e.g., the account device), an indication of attempted access to the particular account (e.g., by the user device or another device) or an indication of an event associated with the particular account that requires approval to be accomplished.

Figure 1B:
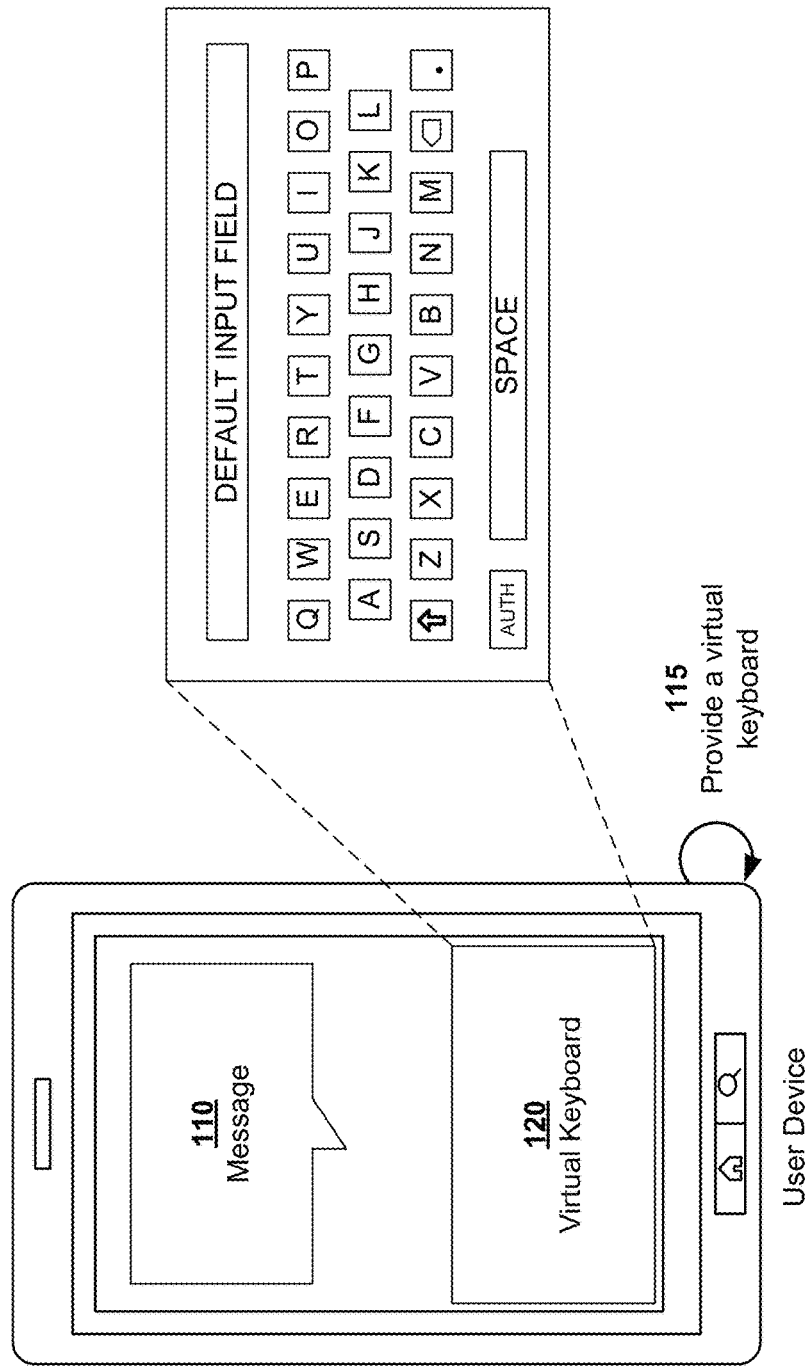

As shown in FIG. 1B, and by reference number 115, the user device may provide a virtual keyboard (e.g., based on receiving the message 110 from the messaging device). The user device may provide the virtual keyboard for display on a display screen of the user device. For example, the user of the user device may execute an application on the user device that is associated with the electronic messaging account (e.g., to allow the user to read messages associated with the electronic messaging account). The user device, based on executing the application, then may present the message 110, such as by displaying the message 110 on the display screen of the user device and/or audibly outputting the message 110 via one or more speakers of the user device. Accordingly, in association with presenting the message 110, the user device may present the virtual keyboard (e.g., on at least a portion of the of the display screen, such as a bottom portion of the display screen) to allow the user of the user device to enter information (e.g., in response to the message 110).

For example, as shown in FIG. 1B, the user device may provide a virtual keyboard 120 for display on the display screen of the user device. The virtual keyboard 120 may include keys for entering characters (shown as QWERTY keys) and an input field (shown as "DEFAULT INPUT FIELD"). Accordingly, the user of the user device may interact with the virtual keyboard 120 (e.g., by touching regions of the display screen that correspond to keys of the virtual keyboard 120) to enter information into the input field of the virtual keyboard 120. In some implementations, as further shown in FIG. 1B, the virtual keyboard may include a particular key (shown as an "AUTH" key) for enabling the user to enter particular input into the virtual keyboard 120, as further described herein.

Figure 1C:
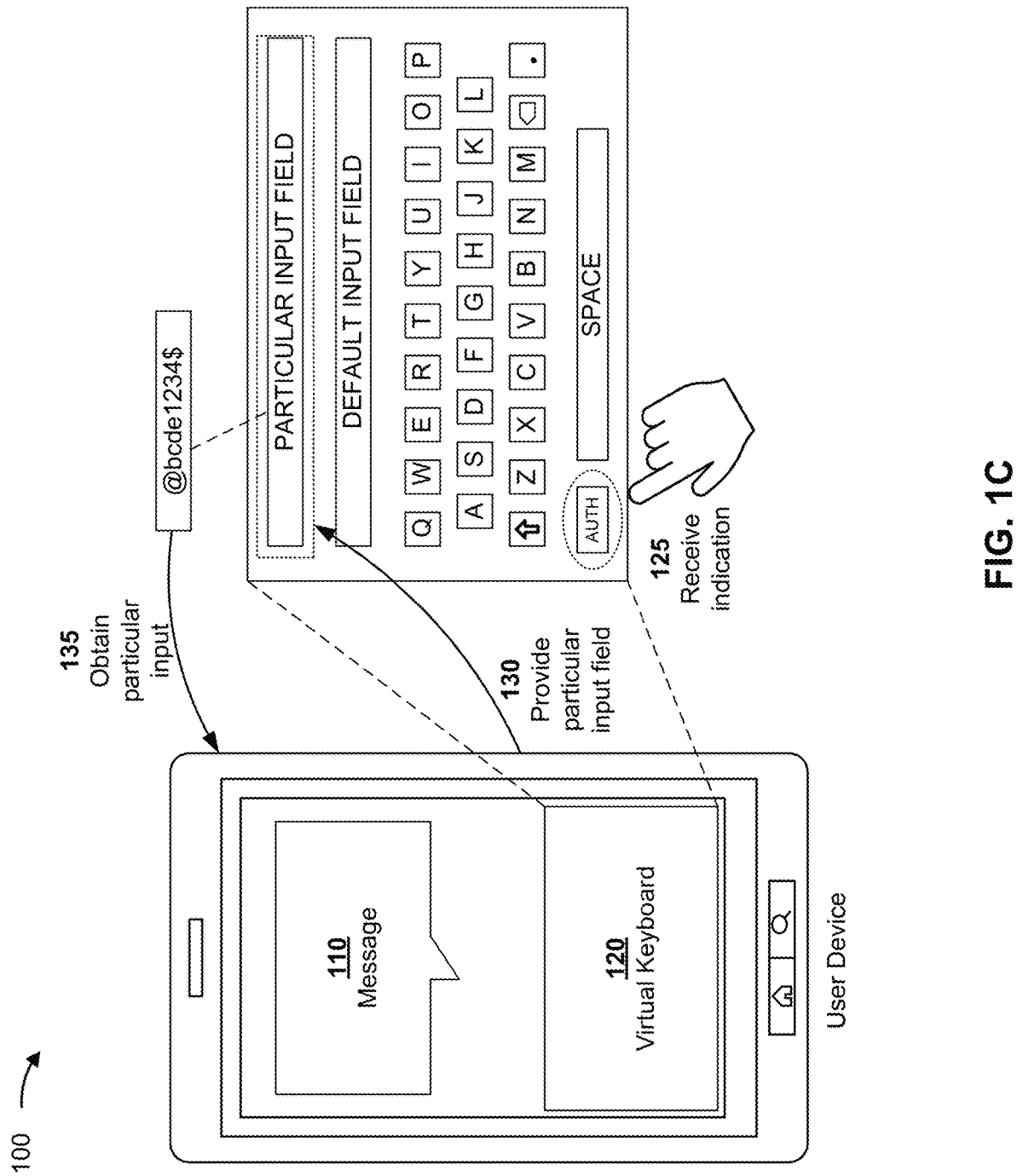

As shown in FIG. 1C, the user of the user device may interact with the virtual keyboard 120 to enter the particular input into the virtual keyboard 120. As shown by reference number 125, the user may interact with the particular key (shown as the "AUTH" key) of the virtual keyboard 120 to indicate that the user is to enter the particular input into the virtual keyboard 120. For example, in response to the message 110, the user may decide to enter the particular input. The particular input may be, for example, an authentication credential (e.g., a password, knowledge-based data, or other information) for accessing the particular account, for approving or disapproving an event that is associated with the particular account, and/or for performance of one or more actions associated with the particular account. Accordingly, based on the user interacting with the particular key, the user device may receive, via the virtual keyboard 120, an indication that the particular input is to be entered.

Additionally, or alternatively, the account device may send to the user device a message indicating that the particular input is to be entered into the virtual keyboard 120. For example, the account device may communicate with the messaging device to cause the messaging device to send the message 110 to the user device. Further, the account device may send a message to the user device indicating that the particular input is to be entered into the virtual keyboard 120 to enable the user to enter the particular input as a response to the message 110.

Accordingly, as further shown in FIG. 1C and by reference number 130, the user device may provide a particular input field of the virtual keyboard 120 for entering the particular input (e.g., based on the indication entered by the user of the user device and/or the message received from the account device). For example, as shown in FIG. 1C, the user device may cause the particular input field of the virtual keyboard 120 to be displayed on a particular region of the virtual keyboard 120 (e.g., via the display of the user device). In some implementations, the particular input field may be the default input field.

The user of the user device may interact with the virtual keyboard 120 (e.g., by interacting with one or more keys of the virtual keyboard 120) to enter the particular input into the particular input field. For example, as shown in FIG. 1C, the user may enter the particular input "@bcde1234$" (e.g., an authentication credential, such as a password) into the particular input field. Accordingly, as shown by reference number 135, the user device may obtain the particular input. For example, upon completion of the user entering the particular input in the particular input field (e.g., based on the user indicating that the user has finished entering the particular input, such as by entering a carriage return in the particular input field), the user device may obtain the particular input from a data structure (e.g., an input buffer or cache) associated with the particular input field of the virtual keyboard 120.

Figure 1D:
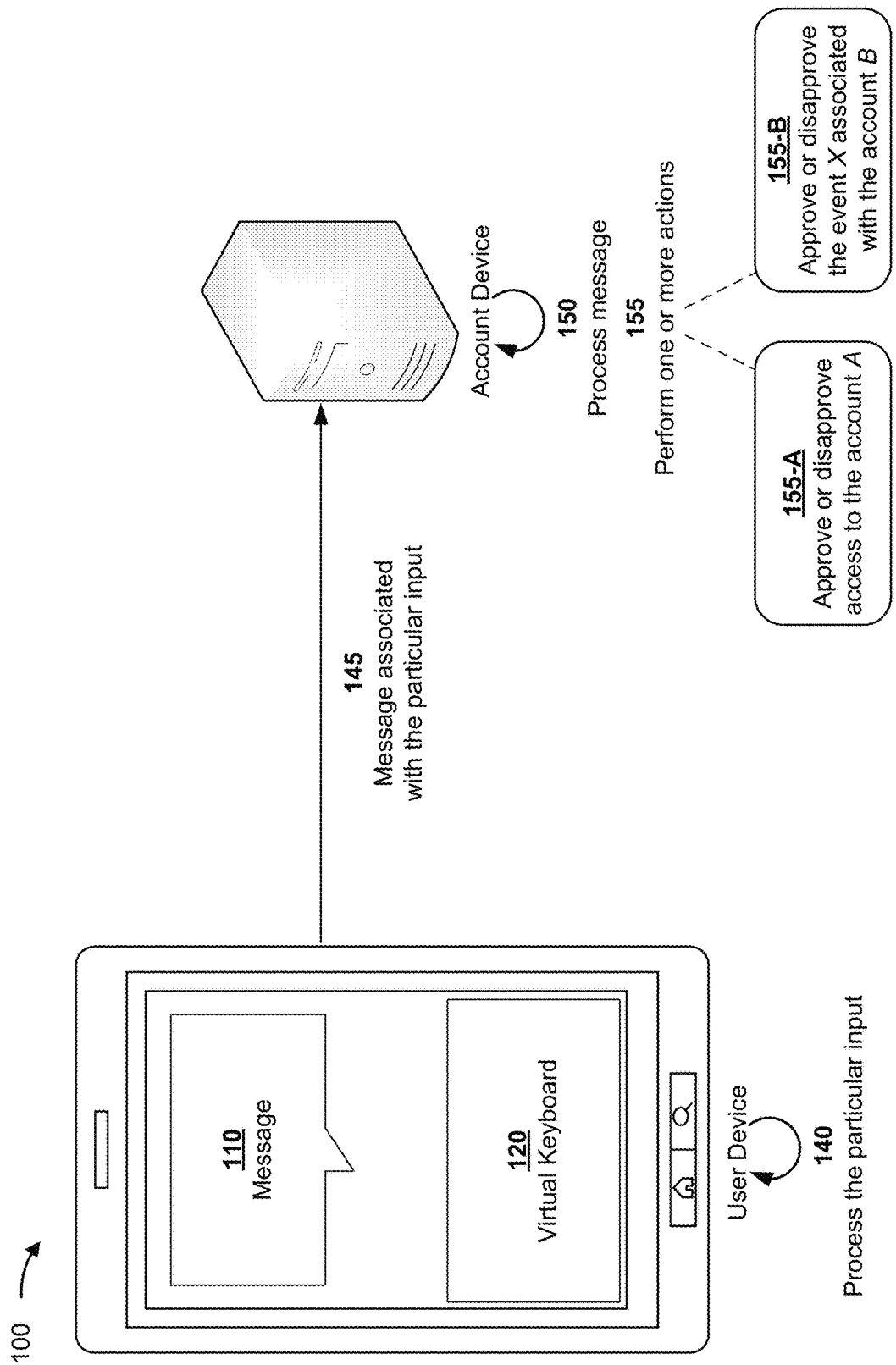

As shown in FIG. 1D, and by reference number 140, the user device may process the particular input. In some implementations, the user device may process the particular input to identify one or more strings included in the particular input. For example, when the particular input includes a "space" character in the middle of the particular input, the user device may process the particular input to identify a first string positioned before the space character and a second string positioned after the space character. Additionally, or alternatively, the user device may process, using one or more cryptographic techniques (e.g., a hash cryptographic technique, a salt-and-hash cryptographic technique, and/or another cryptographic technique), the particular input to generate one or more cryptographic values. For example, the user device may process the one or more strings of the particular input to generate one or more cryptographic values (e.g., that are respectively associated with the one or more strings). In this way, the user device may obscure one or more "true" values associated with the particular input and may therefore safeguard the particular input.

In some implementations, the user device may identify information stored in a data structure of the user device, which may be used to further process the particular input. For example, the user device may identify authentication credential information stored in a data structure that is configured to store information associated with the particular account (e.g., that is associated with the account device). The authentication credential information may include, for example, one or more authentication credentials (e.g., of a user of the user device) associated with the other account. The one or more authentication credentials may be obtained from the user of the user device at a prior time (e.g., when the virtual keyboard 120 is installed on the user device) and the user device may use one or more cryptographic techniques (e.g., as described above) on the one or more authentication credentials to generate and store the authentication credential information in the data structure.

In some implementations, the user device may compare the one or more cryptographic values (e.g., that the user device generated based on the particular input) and the authentication credential information (e.g., that is stored in the data structure) to make an authentication determination. For example, the user device may make a positive authentication determination when the one or more cryptographic values and the authentication credential information match (e.g., the one or more cryptographic values and the authentication credential information are the same). Alternatively, the user device may make a negative authentication determination when the one or more cryptographic values and the authentication credential information do not match (e.g., the one or more cryptographic values and the authentication credential information are not the same).

Accordingly, the user device may generate a message associated with the particular input (e.g., a message associated with authenticating the user). For example, the user device may generate a message that includes the particular input, the one or more cryptographic values (e.g., that the user device generated based on the particular input), and/or the authentication determination. As shown by reference number 145, the user device may send the message associated with the particular input to the account device.

The message associated with the particular input may not be associated with the electronic messaging account. For example, the message associated with the particular input may have a different format than that of the message 110 sent by the messaging device and received by the user device. Accordingly, the message associated with the particular input may be in a format that can be read by the account device and not by the messaging device. In a specific example, the message may not be a text message, an email message, an instant message, a voicemail message, or an audio message.

As shown by reference number 150, the account device may process the message associated with the particular input. For example, the account device may parse the message to identify the particular input, the one or more cryptographic values, and/or the authentication determination included in the message. In some implementations, such as when the message does not include the authentication determination, the account device may process the particular input and/or the one or more cryptographic values (e.g., in a similar manner as that described herein in relation to FIG. 1D and reference number 140). In this way, the account device may make the authentication determination.

As shown by reference number 155, the account device may perform one or more actions (e.g., based on the authentication determination included in the message associated with the particular input or made by the account device). In some implementations, the account device may perform one or more actions associated with the event that is associated with the particular account (e.g., as described herein in relation to FIG. 1A). For example, as shown by reference number 155-A, the account device may approve access (e.g., based on a positive authentication determination) or disapprove access (e.g., based on a negative authentication determination) to the particular account. In this way, a device (e.g., the user device or another device) that has requested access to the particular account may be granted or denied access to the particular account. As another example, as shown by reference number 155-B, the account device may approve (e.g., based on a positive authentication determination) or disapprove (e.g., based on a negative authentication determination) the event that is associated with the particular account, such as access to the particular account or performance of a transaction associated with the particular account. In this way, the account device may allow performance of the event only based on an authenticated response of a user associated with the particular account.

In some implementations, after performing the one or more actions, the account device may communicate with the messaging device. For example, the account device may communicate with the messaging device to provide information to the messaging device indicating that the account device performed the one or more actions (e.g., that are associated with the event that is associated with the particular account of the user). Accordingly, the messaging device may send a message that is associated with the electronic messaging account to the user device indicating the account device performed the one or more actions. For example, the messaging device may send a text message, an email message, an instant message, a voicemail message, and/or an audio message to the user device indicating that the account device performed the one or more actions associated with the event that is associated with the particular account of the user. The user device, based on receiving the message, may display the message on the display screen of the user device (e.g., when the user of the user device executes an application on the user device that is associated with the electronic messaging account).

In some implementations, after obtaining the particular input (e.g., as shown in FIG. 1C and by reference number 135), processing the particular input (e.g., as shown in FIG. 1D and by reference number 140), and/or sending the message associated with the particular input (e.g., as shown in FIG. 1D and by reference number 145), the user device may perform one or more actions in relation to the virtual keyboard 120. For example, the user device may modify some or all of the particular input in the particular input field of the virtual keyboard 120 (e.g., change one or more characters of the particular input to a default character, such as an asterisk (*), in the particular input field). As another example, the user device may delete some or all of the particular input in the input field of the virtual keyboard 120 (e.g., delete one or more characters of the particular input in the particular input field). In an additional example, the user device may add one or more strings to the particular input in the input field of the virtual keyboard 120 (e.g., add the one or more strings to one or more positions before, within, or after the particular input in the particular input field). In this way, the user device may obscure the particular input in the particular input field, and may therefore safeguard the particular input.

In some implementations, the user device may prevent transmission of a message that includes the particular input and/or that is associated with the electronic messaging account. For example, the user device may disable an "enter" key of the virtual keyboard 120 that would otherwise cause the particular input to be transmitted to the messaging device (e.g., as a response message to the message 110 sent by the messaging device to the user device). In this way, the user device prevents inadvertent disclosure of the particular input to the messaging device or another device that has access to messages associated with the electronic messaging account.

As indicated above, FIGS. 1A-1D are provided as an example. In practice, there may be additional devices and/or networks, fewer devices and/or networks, different devices and/or networks, or differently arranged devices and/or networks than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) of one or more examples 100 may perform one or more functions described as being performed by another set of devices of one or more examples 100. For example, the user device may perform one or more functions described as being performed by the account device, or vice versa.

Figure 2:
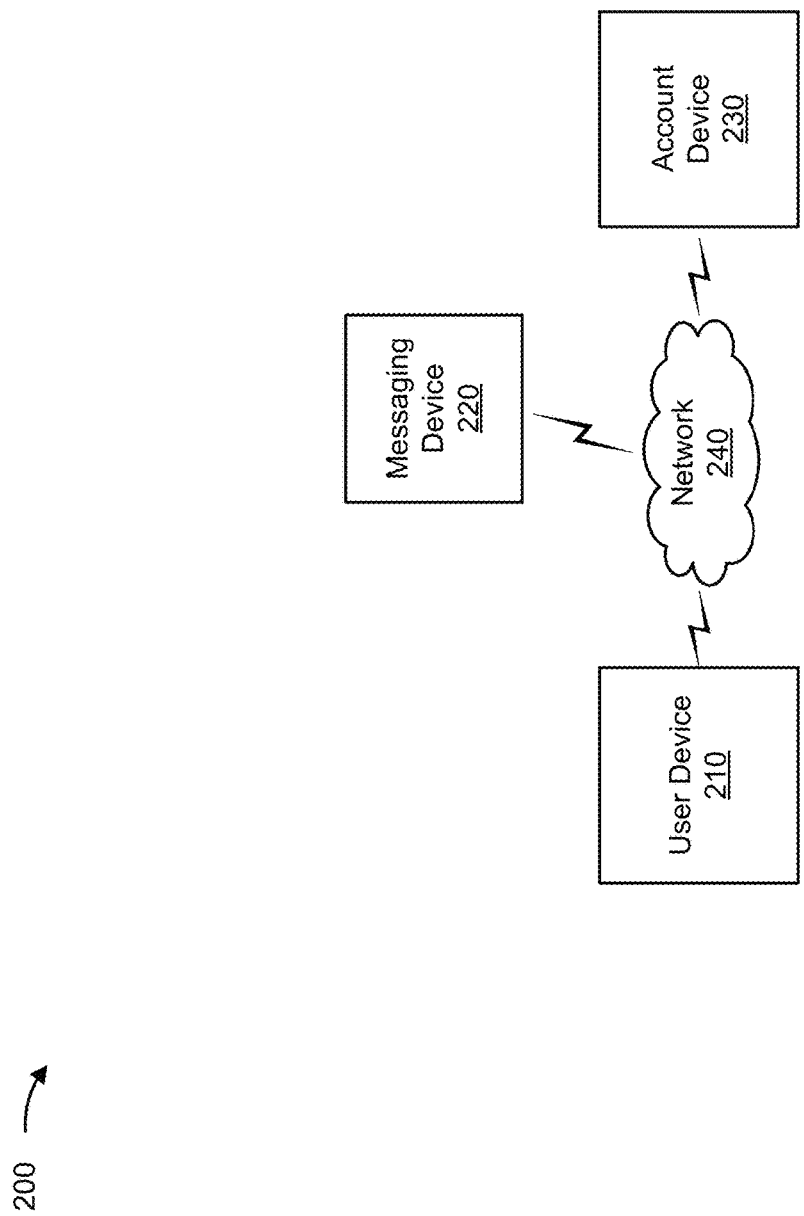
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 210, a messaging device 220, an account device 230, and a network 240. Devices of environment 200 may interconnect via wired connections, wireless connections, or a combination of wired and wireless connections.

The user device 210 includes one or more devices capable of receiving, generating, storing, processing, and/or providing information, as described elsewhere herein. The user device 210 may include a communication device and/or a computing device. For example, the user device 210 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device. In some implementations, the user device 210 may provide a virtual keyboard for obtaining particular input, as described elsewhere herein. The user device 210 may communicate, via the network 240, with the messaging device 220 and/or the account device 230, as described elsewhere herein.

The messaging device 220 includes one or more devices capable of receiving, generating, storing, processing, providing, and/or routing information, as described elsewhere herein. The messaging device 220 may include a communication device and/or a computing device. For example, the messaging device 220 may include a server, such as an application server, a client server, a web server, a database server, a host server, a proxy server, a virtual server (e.g., executing on computing hardware), or a server in a cloud computing system. In some implementations, the messaging device 220 includes computing hardware used in a cloud computing environment. The messaging device 220 may be associated with an electronic messaging account of a user of the user device 210, as described elsewhere herein.

The account device 230 includes one or more devices capable of receiving, generating, storing, processing, providing, and/or routing information, as described elsewhere herein. The account device 230 may include a communication device and/or a computing device, such as a messaging device. For example, the account device 230 may include a server, such as an application server, a web server, a proxy server, a virtual server (e.g., executing on computing hardware), or a server in a cloud computing system. In some implementations, the account device 230 includes computing hardware used in a cloud computing environment. In some implementations, the messaging device 220 is implemented on and integrated with the account device 230 (e.g., to grant or deny access to resources hosted or served by the account device 230). The account device 230 may be associated with an account of a user of the user device 210, as described elsewhere herein.

The network 240 includes one or more wired and/or wireless networks. For example, the network 240 may include a cellular network, a public land mobile network, a local area network, a wide area network, a metropolitan area network, a telephone network, a private network, the Internet, and/or a combination of these or other types of networks. The network 240 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
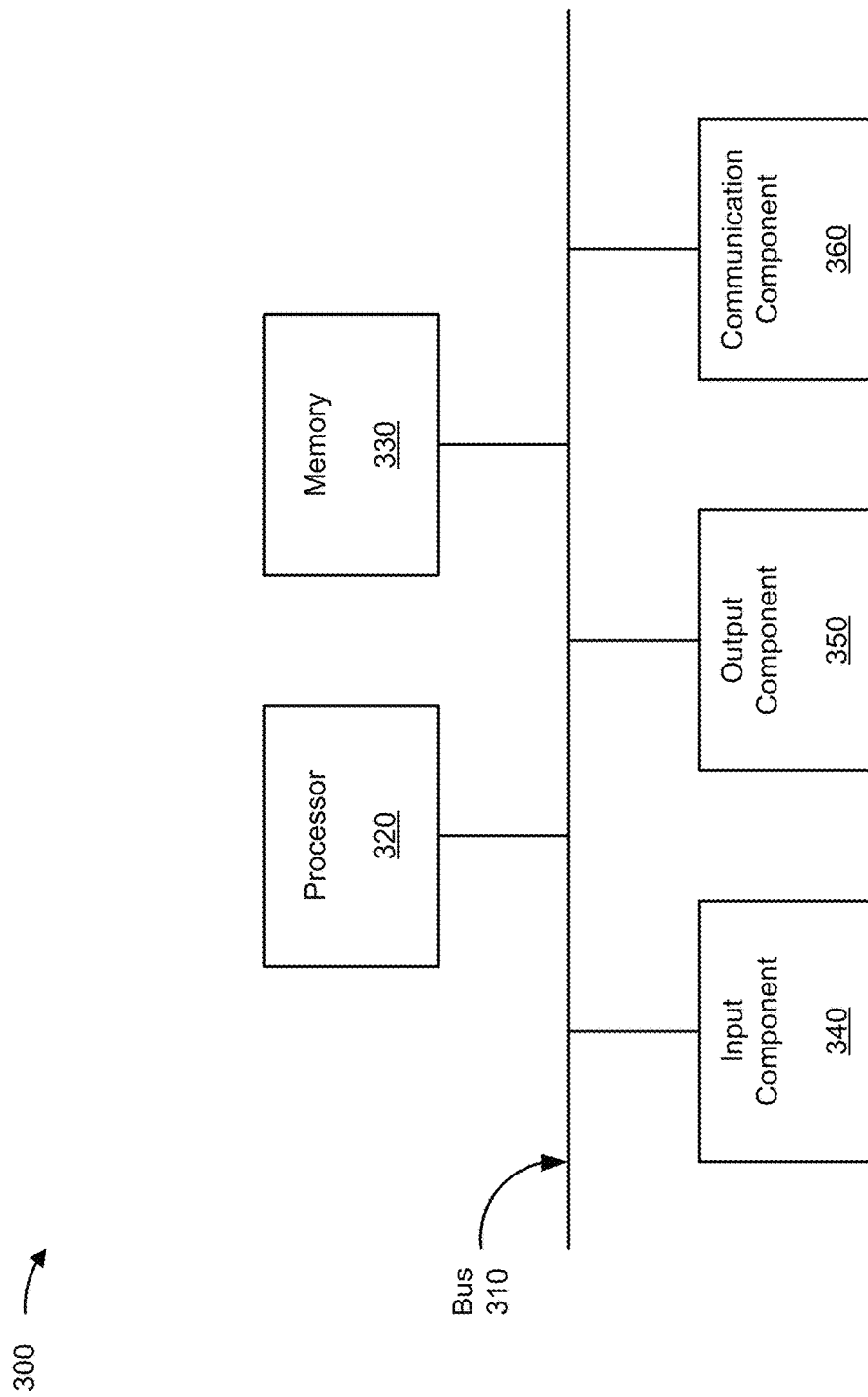
FIG. 3 is a diagram of example components of one or more devices of FIG. 2.

FIG. 3 is a diagram of example components of a device 300, which may correspond to the user device 210, the messaging device 220, and/or the account device 230. In some implementations, the user device 210, the messaging device 220, and/or the account device 230 include one or more devices 300 and/or one or more components of device 300. As shown in FIG. 3, device 300 may include a bus 310, a processor 320, a memory 330, an input component 340, an output component 350, and a communication component 360.

Bus 310 includes one or more components that enable wired and/or wireless communication among the components of device 300. Bus 310 may couple together two or more components of FIG. 3, such as via operative coupling, communicative coupling, electronic coupling, and/or electric coupling. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform one or more operations or processes described elsewhere herein.

Memory 330 includes volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 includes one or more memories that are coupled to one or more processors (e.g., processor 320), such as via bus 310.

Input component 340 enables device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry is used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
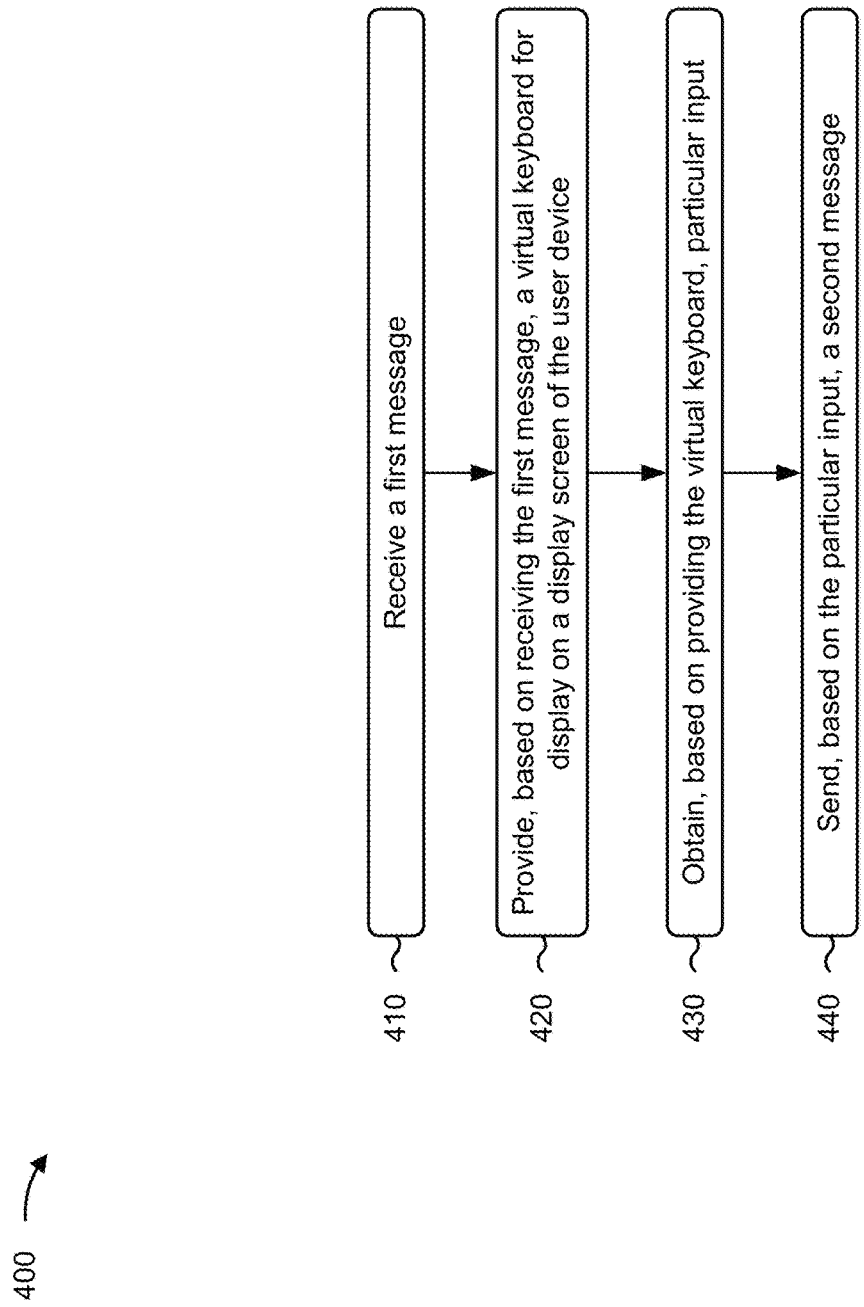
FIG. 4 is a flowchart of an example process relating using a virtual keyboard to enter particular input.

FIG. 4 is a flowchart of an example process 400 associated with using a virtual keyboard to enter particular input. In some implementations, one or more process blocks of FIG. 4 may be performed by a user device (e.g., user device 210). In some implementations, one or more process blocks of FIG. 4 may be performed by another device or a group of devices separate from or including the user device, such as a messaging device (e.g., messaging device 220) and/or an account device (e.g., account device 230). Additionally, or alternatively, one or more process blocks of FIG. 4 may be performed by one or more components of device 300, such as processor 320, memory 330, input component 340, output component 350, and/or communication component 360.

As shown in FIG. 4, process 400 may include receiving a first message (block 410). The first message may be associated with an electronic messaging account of a user of the user device and may include information indicating an event that is associated with another account of the user. As further shown in FIG. 4, process 400 may include providing, based on receiving the first message, a virtual keyboard for display on a display screen of the user device (block 420). As further shown in FIG. 4, process 400 may include obtaining, based on providing the virtual keyboard, particular input (block 430). As further shown in FIG. 4, process 400 may include sending, based on the particular input, a second message (block 440). The second message may not be associated with the electronic messaging account. Sending the second message to another device is to cause the other device to perform one or more actions associated with the event that is associated with the other account of the user.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1D.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user device, the user device comprising:
one or more memories; and
one or more processors, communicatively coupled to the one or more memories, configured to:
receive a first message for display that is associated with an electronic messaging account of a user of the user device,
wherein the first message includes information indicating an event that is associated with another account of the user;
provide, based on receiving the first message, a virtual keyboard for display on a display screen of the user device,
wherein a display of the virtual keyboard includes a default input field;
receive an indication from the virtual keyboard that a particular input is to be entered;
provide, for display, a particular input field and the default input field on the virtual keyboard based on receiving the indication from the virtual keyboard;
obtain the particular input in the particular input field on the virtual keyboard;
generate one or more cryptographic values based on the particular input;
compare the one or more cryptographic values and authentication credential information, stored in a data structure, to make an authentication determination;
send, to an authentication device and based on the particular input and the authentication determination, a second message that is associated with authenticating the user,
wherein sending the second message is to cause the authentication device to perform one or more actions associated with the event that is associated with the other account of the user; and
modify some or all of the particular input in the particular input field on the virtual keyboard by changing one or more characters of the particular input to a default character in the particular input field on the virtual keyboard.

2. The user device of claim 1, wherein the event is associated with access to the other account, and
wherein the particular input is an authentication credential for accessing the other account.

3. The user device of claim 1, wherein the first message is:
a text message,
an email message,
an instant message,
a voicemail message, or
an audio message.

4. The user device of claim 1, wherein the indication is a first indication, and
wherein the one or more processors are further configured to:
receive, via the virtual keyboard, a second indication that the particular input is to be entered; and
wherein the one or more processors, to provide the particular input field, are configured to:
provide, based on the first indication and the second indication, the particular input field on the virtual keyboard for entering the particular input.

5. The user device of claim 1, wherein the one or more processors, to send the second message, are configured to:
process the particular input to identify one or more strings included in the particular input;
identify the authentication credential information stored in the data structure configured to store information associated with the other account of the user; and
wherein the one or more processors, to generate the one or more cryptographic values, are to:
process, using one or more cryptographic techniques, the one or more strings to generate the one or more cryptographic values.

6. The user device of claim 1, wherein the one or more processors are further configured to:
process the particular input to identify one or more strings included in the particular input;
process, using one or more cryptographic techniques, the one or more strings to generate the one or more cryptographic values;
generate the second message to include the one or more cryptographic values; and
send the second message to the authentication device.

7. The user device of claim 1,
wherein the one or more processors, after sending the second message, are further configured to at least one of:
delete some or all of the particular input in the particular input field on the virtual keyboard; or
add one or more strings to the particular input in the particular input field on the virtual keyboard.

8. The user device of claim 1, wherein the one or more processors are further configured to:
receive a third message that is associated with the electronic messaging account,
wherein the third message includes information indicating that the authentication device performed the one or more actions associated with the event that is associated with the other account of the user.

9. The user device of claim 1, wherein the one or more processors are further configured to:
prevent, based on at least one of obtaining the particular input or sending the second message, transmission of a third message that includes the particular input and that is associated with the electronic messaging account.

10. A non-transitory computer-readable medium storing a set of instructions, the set of instructions comprising:
one or more instructions that, when executed by one or more processors of a user device, cause the user device to:
receive a first message for display that is associated with an electronic messaging account of a user of the user device,
wherein the first message includes information indicating an event that is associated with another account of the user;
provide, based on receiving the first message, a virtual keyboard for display on a display screen of the user device,
wherein the virtual keyboard includes a default input field;
receive an indication, from the virtual keyboard, that a particular input is to be entered;
provide, for display, a particular input field and the default input field on the virtual keyboard based on receiving the indication from the virtual keyboard;
obtain the particular input in the particular input field;
generate one or more cryptographic values based on the particular input;
compare the one or more cryptographic values and authentication credential information, stored in a data structure, to make an authentication determination;
send, to another device and based on the authentication determination, a second message that is not associated with the electronic messaging account,
wherein sending the second message is to cause the other device to perform one or more actions associated with the event that is associated with the other account of the user; and
modify some or all of the particular input in the particular input field on the virtual keyboard by changing one or more characters of the particular input in the particular input field on the virtual keyboard.

11. The non-transitory computer-readable medium of claim 10, wherein the first message is a request for approval of the event, and
wherein the particular input is an authentication credential for approving or disapproving the event.

12. The non-transitory computer-readable medium of claim 10,
wherein the one or more instructions further cause the user device to:
delete some or all of the particular input in the particular input field on the virtual keyboard; or
add one or more strings to the particular input in the input field on the virtual keyboard.

13. The non-transitory computer-readable medium of claim 10, wherein the data structure is stored in the user device.

14. A method, comprising:
receiving, by a user device and from a first other device, a first message for display,
wherein the first message includes information indicating an event associated with an account of a user of the user device;
providing, by the user device and based on receiving the first message, a virtual keyboard for display on a display screen of the user device,
wherein the virtual keyboard includes a default input field;
receiving, by the user device, an indication, from the virtual keyboard, that a particular input is to be entered;
providing, by the user device and for display, a particular input field and the default input field on the virtual keyboard based on receiving the indication from the virtual keyboard;
obtaining, by the user device, particular input in the particular input field;
generating, by the user device, one or more cryptographic values based on the particular input;
comparing, by the user device, the one or more cryptographic values and authentication credential information, stored in a data structure, to make an authentication determination;
sending, by the user device, to a second other device, and based on the particular input, a second message,
wherein sending the second message is to cause the second other device to perform one or more actions associated with the event that is associated with the account of the user; and
modifying, by the user device, some or all of the particular input in the particular input field on the virtual keyboard by changing one or more characters of the particular input in the particular input field on the virtual keyboard.

15. The method of claim 14, wherein the first other device is associated with an electronic communication account of the user and the second other device is not associated with the electronic communication account of the user.

16. The method of claim 14, further comprising:
preventing, based on at least one of obtaining the particular input or sending the second message, transmission of a third message to the first other device that includes the particular input.

17. The method of claim 14, wherein the authentication determination is a positive authentication determination when the one or more cryptographic values and the authentication credential information match.

18. The method of claim 14, wherein the authentication determination is a negative authentication determination when the one or more cryptographic values and the authentication credential information do not match.

19. The method of claim 14, wherein the indication is a first indication, and
wherein the method further comprises:
receiving, via the virtual keyboard, a second indication that the particular input is to be entered; and
wherein providing the particular input field on the virtual keyboard comprises:
providing, based on the first indication and the second indication, the particular input field on the virtual keyboard for entering the particular input.

* * * * *